United States Patent
Geerlings et al.

(10) Patent No.: US 10,604,075 B2
(45) Date of Patent: Mar. 31, 2020

(54) WAVEGUIDE MIRROR DISPLAY SYSTEM

(71) Applicant: Gentex Corporation, Zeeland, MI (US)

(72) Inventors: Kurtis L. Geerlings, Zeeland, MI (US); William L. Tonar, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 212 days.

(21) Appl. No.: 15/728,556

(22) Filed: Oct. 10, 2017

(65) Prior Publication Data
US 2018/0105114 A1    Apr. 19, 2018

Related U.S. Application Data

(60) Provisional application No. 62/407,763, filed on Oct. 13, 2016.

(51) Int. Cl.
*B60R 1/08*    (2006.01)
*G02F 1/157*    (2006.01)
(Continued)

(52) U.S. Cl.
CPC .............. *B60R 1/088* (2013.01); *G02F 1/157* (2013.01); *G02F 1/163* (2013.01); *B60R 1/04* (2013.01); *G02F 2201/44* (2013.01)

(58) Field of Classification Search
CPC ...... G02B 2027/011; G02B 2027/0112; G02B 2027/0118; G02B 2027/145;
(Continued)

(56) References Cited

U.S. PATENT DOCUMENTS

| 5,434,407 A | 1/1995 | Bauer et al. |
| 5,448,397 A | 9/1995 | Tonar |

(Continued)

FOREIGN PATENT DOCUMENTS

| EP | 1599861 B1 | 8/2010 |
| EP | 2733517 A1 | 5/2014 |

(Continued)

OTHER PUBLICATIONS

International Search Report and Written Opinion of the International Searching Authority, dated Mar. 6, 2018, for International Application No. PCT/US2017/055898 filed Oct. 10, 2017, 10 pages.

(Continued)

*Primary Examiner* — Robert E. Tallman
(74) *Attorney, Agent, or Firm* — Price Heneveld LLP; Bradley D. Johnson

(57) ABSTRACT

A vehicle display mirror system is disclosed. The system comprises an electro-optic device configured to switch between a mirror state and a display state. The electro-optic device comprises a first substrate and a second substrate forming a cavity. The cavity is configured to retain an electro-optic medium that is variably transmissive such that the electro-optic device is operable between substantially clear and darkened states. The system further comprises a substantially transparent display disposed adjacent to the electro-optic device. The substantially transparent display comprises a switchable output grating configured to selectively diffract light outward from the waveguide.

20 Claims, 6 Drawing Sheets

(51) Int. Cl.
  *G02F 1/163* (2006.01)
  *B60R 1/04* (2006.01)
(58) Field of Classification Search
  CPC ............ G02B 2027/0147; G02B 17/00; G02B
         17/01; G02B 17/0101; G02F 1/00; G02F
         1/0018; G02F 1/01; G02F 1/011; G02F
         1/15; G02F 1/153; G02F 1/1578; G02F
         1/163
  See application file for complete search history.

(56) References Cited

U.S. PATENT DOCUMENTS

| | | |
|---|---|---|
| 5,451,822 A | 9/1995 | Bechtel et al. |
| 5,818,625 A | 10/1998 | Forgette et al. |
| 5,856,842 A | 1/1999 | Tedesco |
| 6,020,987 A | 2/2000 | Baumann et al. |
| 6,055,089 A | 4/2000 | Schulz et al. |
| 6,157,480 A | 12/2000 | Anderson et al. |
| 6,690,268 B2 | 2/2004 | Schofield et al. |
| 7,209,277 B2 | 4/2007 | Tonar et al. |
| 7,379,224 B2 | 5/2008 | Tonar et al. |
| 7,579,939 B2 | 8/2009 | Schofield et al. |
| 7,579,940 B2 | 8/2009 | Schofield et al. |
| 7,583,184 B2 | 9/2009 | Schofield et al. |
| 7,663,798 B2 | 2/2010 | Tonar et al. |
| 7,719,750 B2 | 5/2010 | Tonar et al. |
| 7,855,755 B2 | 12/2010 | Weller et al. |
| 7,978,393 B2 | 7/2011 | Tonar et al. |
| 8,441,707 B2 | 5/2013 | Lam et al. |
| 9,134,585 B2 | 9/2015 | Tonar et al. |
| 9,176,357 B2 | 11/2015 | Lam et al. |
| 9,550,457 B2 | 1/2017 | Green et al. |
| 2002/0154379 A1 | 10/2002 | Tonar et al. |
| 2010/0097469 A1* | 4/2010 | Blank ................. B60R 1/12 348/148 |
| 2014/0140654 A1* | 5/2014 | Brown ................. G02F 1/29 385/10 |
| 2014/0176528 A1 | 6/2014 | Robbins |
| 2018/0105114 A1 | 4/2018 | Geerlings et al. |

FOREIGN PATENT DOCUMENTS

| | | |
|---|---|---|
| EP | 2848993 A1 | 3/2015 |
| EP | 1952189 B1 | 6/2016 |
| WO | 2015048161 A1 | 4/2015 |

OTHER PUBLICATIONS

Ashmead, Allan, DigiLens, Inc., "Electronically Switchable Bragg Gratings Provide Versatility," Lightwave, Passive and Active Components, Special Reports, Mar. 1, 2001, 7 pages, Web. Oct. 9, 2017. </http://www.lightwaveonline.com/articles/print/volume-18/issue-3/special-report/electronically-switchable-bragg-gratings-provide-versatility-53466867.html>.

* cited by examiner

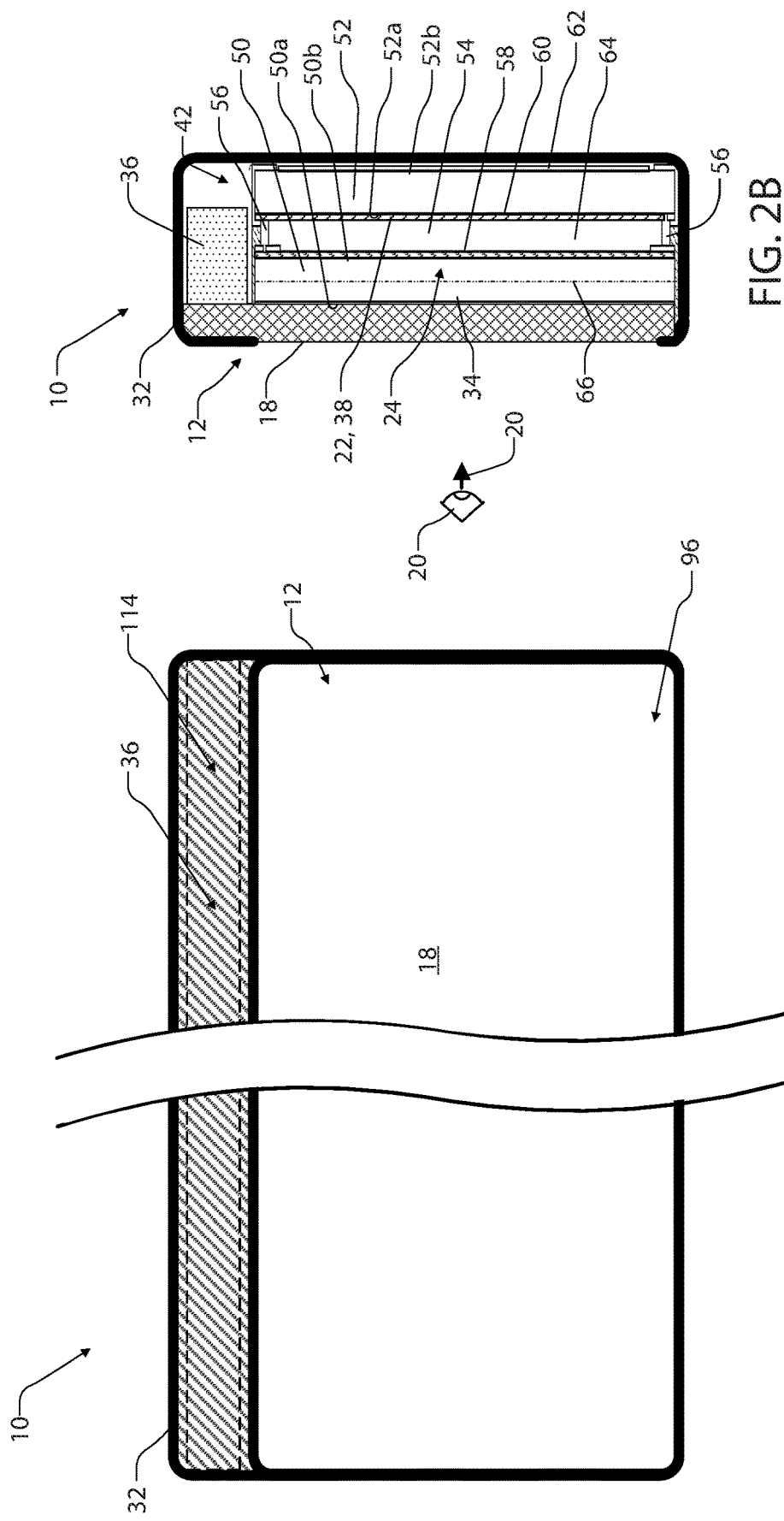

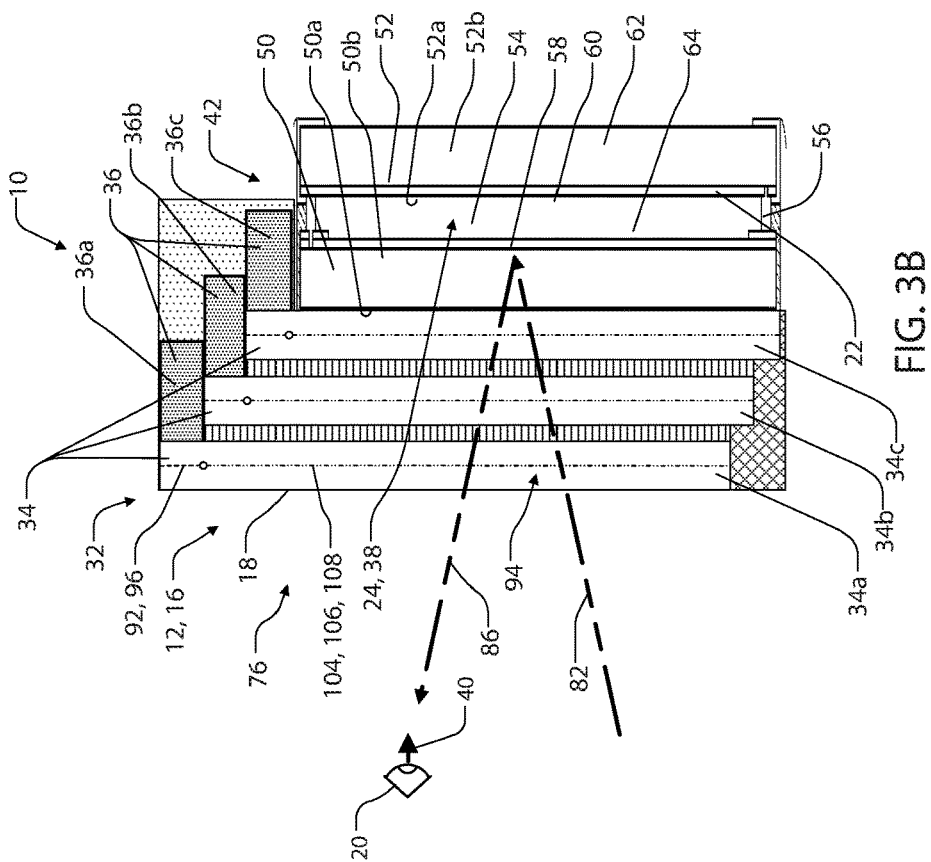
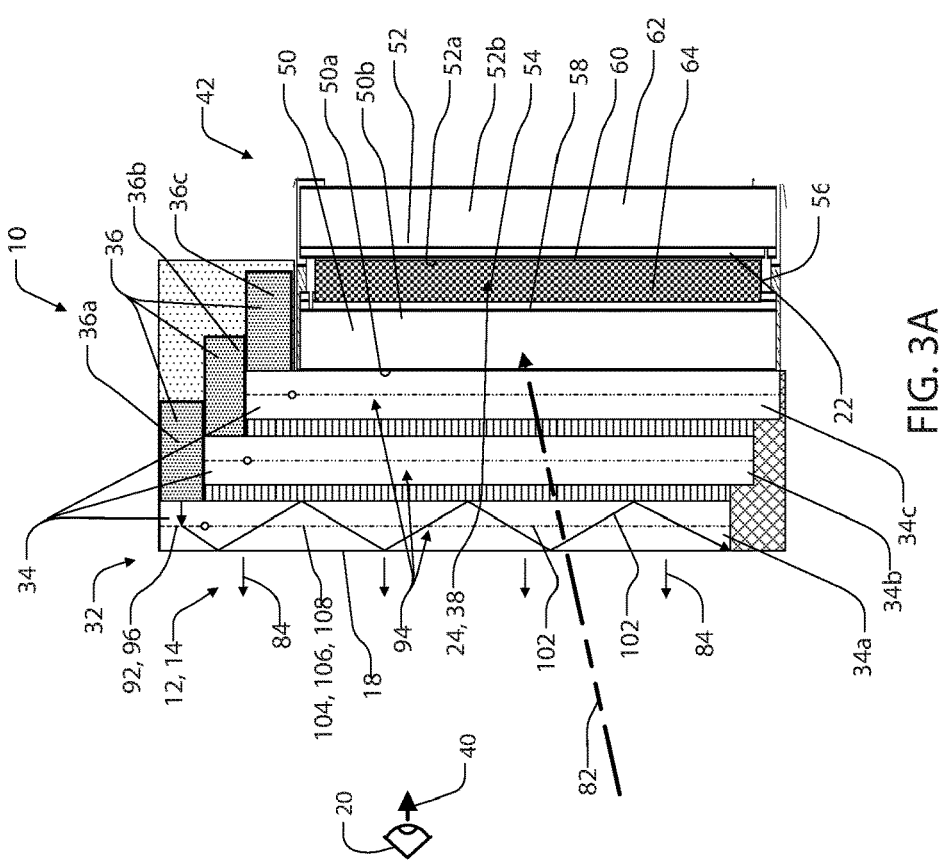

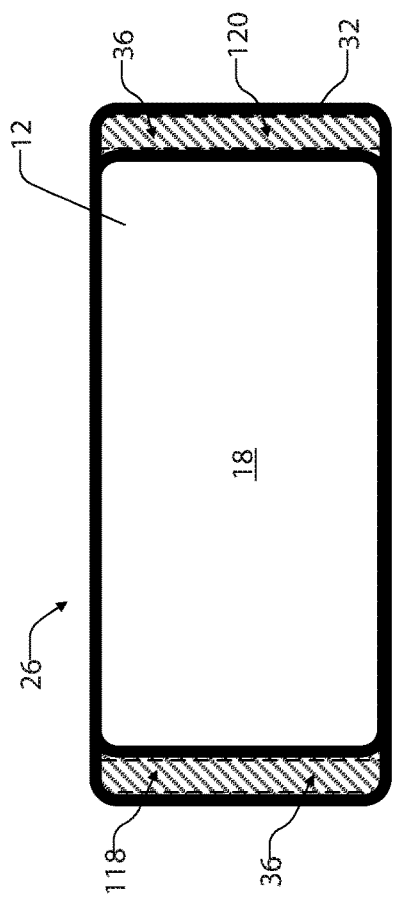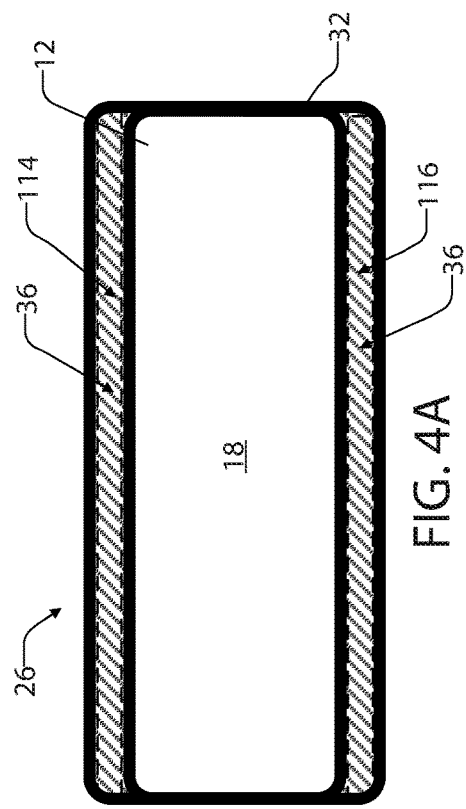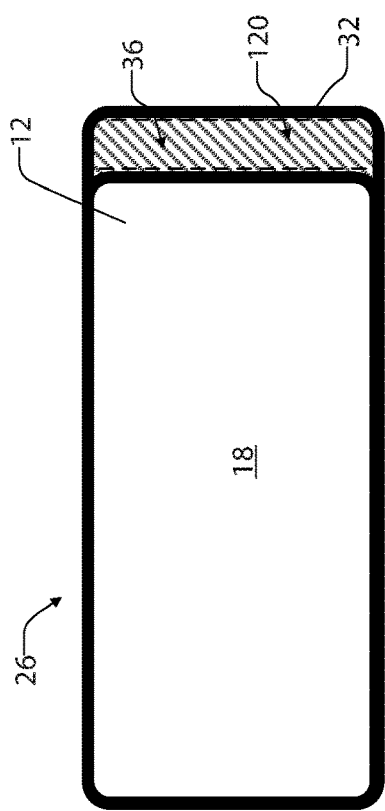
FIG. 4A
FIG. 4B
FIG. 4C

_US 10,604,075 B2_

WAVEGUIDE MIRROR DISPLAY SYSTEM

CROSS-REFERENCE TO RELATED APPLICATION

This application claims priority to and the benefit under 35 U.S.C. § 119(e) of U.S. Provisional Patent Application No. 62/407,763, filed on Oct. 13, 2016, entitled "WAVEGUIDE MIRROR DISPLAY SYSTEM," the entire disclosure of which is hereby incorporated herein by reference.

TECHNOLOGICAL FIELD

The present disclosure generally relates to an emissive display system, and more particularly, an emissive display system having an electro-optic device.

BACKGROUND OF THE DISCLOSURE

Electro-optic assemblies may be used in various vehicular and building applications. Use of these assemblies in various applications can be limited by cost, aesthetic, and functional considerations. The disclosure provides for various embodiments of an improved electro-optic assembly as described in the following disclosure.

BRIEF SUMMARY

According to one aspect of the present disclosure, a vehicle display mirror system is disclosed. The system comprises an electro-optic device configured to switch between a mirror state and a display state. The electro-optic device comprises a first substrate and a second substrate forming a cavity. The cavity is configured to retain an electro-optic medium that is variably transmissive such that the electro-optic device is operable between substantially clear (i.e. transmissive) and darkened states (i.e. absorptive). The system further comprises a substantially transparent display disposed adjacent to the electro-optic device. The substantially transparent display comprises a switchable output grating configured to selectively diffract light outward from the waveguide.

According to another aspect of the present disclosure, a method for displaying a rearward directed view from a vehicle for a display mirror system is disclosed. The method comprises in a first display state, reflecting a rearward directed view in a projection direction through a transparent waveguide display from a mirror surface. The method further comprises adjusting from the first display state to a second display state by controlling a transmittance of an electro-optic element. Additionally, the method comprises activating a display driver and transmitting visual light data into the transparent waveguide display in the second display state. The second display state is configured to project the visual light data from the transparent waveguide display in the projection direction such that the electro-optic element controls the contrast of the visual light data projected from the transparent waveguide display.

According to yet another aspect of the present disclosure, a vehicle display mirror system is disclosed. The system comprises an electro-optic device configured to switch between a mirror state and a display state. The electro-optic device comprises a first substantially transparent substrate having first and second surfaces disposed on opposite sides thereof. At least one of the first and second surfaces comprises a first electrically conductive layer. The electro-optic device further comprises a second substantially transparent substrate having third and fourth surfaces disposed on opposite sides thereof. At least one of the third and fourth surfaces comprises a second electrically conductive layer. An electro-optic medium is disposed in a cavity between the first and second substantially transparent substrates. The electro-optic medium is variably transmissive such that the electro-optic device is operable between a substantially clear state and a darkened state.

A substantially transparent display disposed adjacent to the electro-optic device. The substantially transparent display comprises a display driver configured to generate light. The substantially transparent display further comprises a waveguide comprising a diffractive element. The diffractive element is configured to selectively extract the light from the waveguide outputting visual light data on the transparent display. The electro-optic device is converted to the absorptive state in the display state.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

BRIEF DESCRIPTION OF THE DRAWINGS

In the drawings:

FIG. 2A is a front view of a display assembly according to one aspect of the disclosure;

FIG. 2B is a side cross-sectional view of the display assembly of FIG. 2A, in accordance with an aspect of the disclosure;

FIG. 3A is a detailed cross-sectional view of a display assembly in a display state, in accordance with another aspect of the disclosure;

FIG. 3B is a detailed cross-sectional view of a display assembly in a transparent or mirror state, in accordance with another aspect of the disclosure;

FIG. 4A is a front view of a display assembly demonstrating a configuration of a display driver for a waveguide of the display assembly;

FIG. 4B is a front view of a display assembly demonstrating a configuration of a display driver for a waveguide of the display assembly;

FIG. 4C is a front view of a display assembly demonstrating a configuration of a display driver for a waveguide of the display assembly.

DETAILED DESCRIPTION OF EMBODIMENTS

Figure 1:
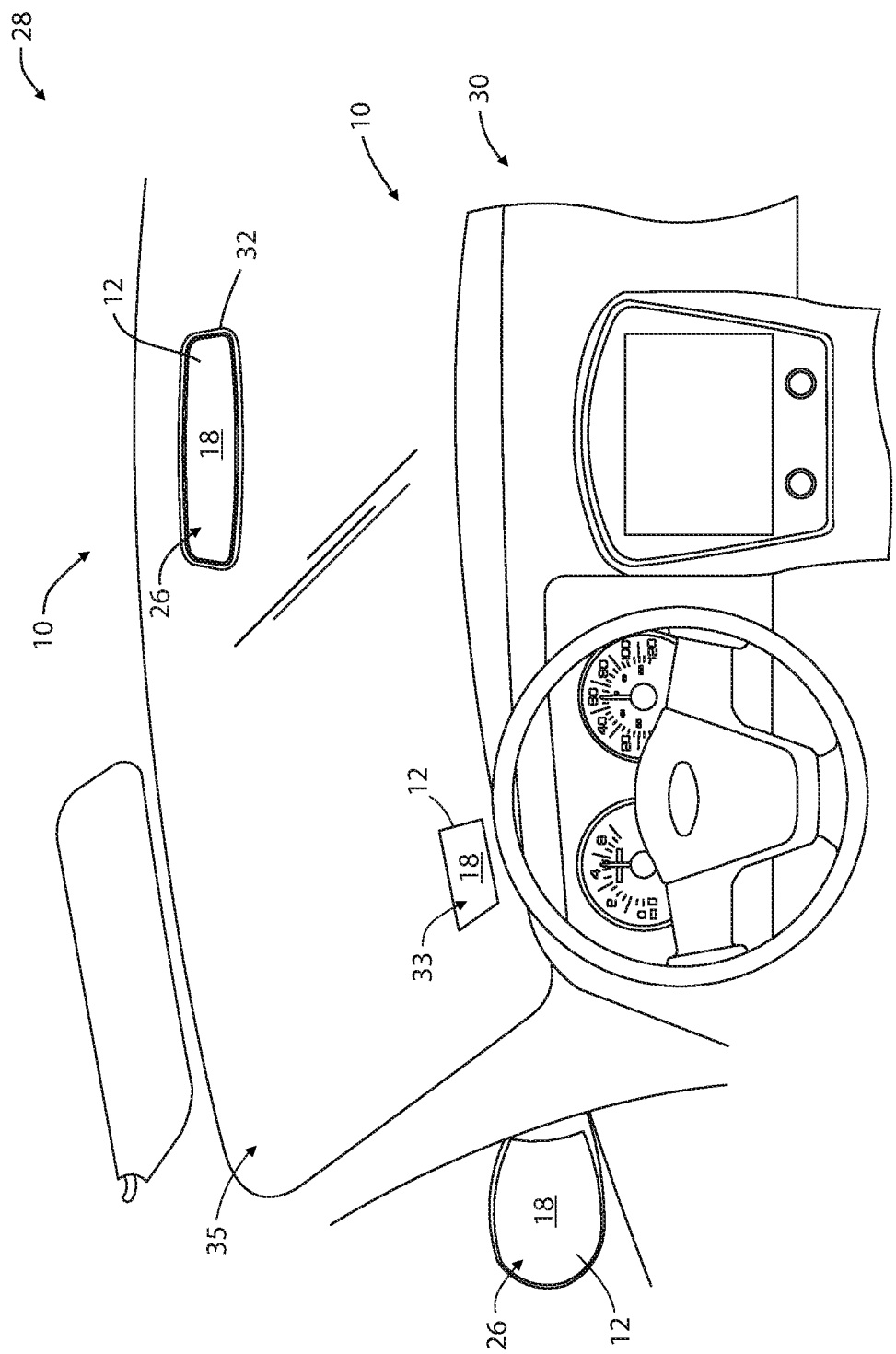
FIG. 1 in a projected view of a passenger compartment of a vehicle comprising a display system.

The present illustrated embodiments reside primarily in combinations of method steps and apparatus components related to an electro-optic device. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-3, an emissive display system 10 is depicted including a substantially transparent display. The substantially transparent display may correspond to a waveguide display 12 or other emissive display device. The emissive display system 10 may be operable to change operating states from a display state 14 as demonstrated in FIG. 3A to a transparent state 16 demonstrated in FIG. 3B. In the display state 14, a viewing surface 18 of the display system 10 may be configured to project image data outward toward a viewer 20. In the transparent state 16, the display 12 may be substantially transparent allowing a reflective surface 22 to function as a mirror device 24. As further discussed herein, the display 12 may provide for various combinations of displaying image data and/or light reflected demonstrating a scene rearward of a vehicle 28.

In an exemplary embodiment, the display system 10 may be configured to function as a rearview display 26 for the vehicle 28. In the display state 14, the waveguide display 12 may display image data on the viewing surface 18. The image data may be captured by one or more imagers in communication with the display system 10. Such imagers are further discussed in reference to FIG. 5 and may be configured to capture image data of various fields of view of a passenger compartment 30 and/or various view of scenes proximate the vehicle 28. In this way, the display system 10 may selectively display the image data, a reflected scene, or a combination of the image data and the reflected scene.

A display assembly 32 of the display system 10 may be implemented as an interior rearview display, a side-mirror display, and/or various other mirrored devices. Though discussed in reference to an automotive vehicle, the display system 10 may be utilized for various applications, including, but not limited to, transit vehicles, nautical vessels, aircraft, etc. Accordingly, the disclosed embodiments may be combined or modified to suit various applications without departing from the spirit of the disclosure.

In some embodiments, the display assembly 32 may be implemented as a heads up display 33, which may be affixed or laminated to a windscreen 35 of the vehicle 28. In such a configuration, the electro-optic device 42 discussed herein may be configured to be substantially transparent. Such a configuration may utilize substantially transparent electrodes corresponding to the first electrode 58 and the second electrode 60. Such electrodes may comprise substantially transparent conductive materials, such as indium tin oxide (ITO) and other similar materials. In this configuration, the controller of the electro-optic device 42 may be configured to selectively control the transmittance of the electro-optic device 42 to control a contrast between the windscreen 35 and the display assembly 32. In this way, the controller may control the transmittance of the electro-optic device 42 to provide a contrast to improve a visibility of the image data and/or graphics displayed on the viewing surface 18.

As discussed herein, the term substantially may be used to describe a level of transparency or transmittance that is not totally or absolutely transmissive to light, but, nevertheless, provides for a visually cognizable level of transmission. Accordingly, the substantially transmissive or transparent element discussed herein may have a light transmittance percentage of 50% or more. Accordingly, a body discussed herein as being in a substantially light transmissive state may transmit 50% or more light. In contrast, substantially light absorptive, darkened, or light blocking configurations may transmit less than 50% of the received light. In various embodiments, the substantially light transmissive state may have a light transmission of 80% or greater, while the light absorptive state may have a light transmission less than 20%.

In some embodiments, the heads up display 33 may correspond to a standalone device that may be mounted or attached to a dashboard or console of the vehicle 28. In such embodiments, the heads up display 33 may correspond to a pop up display that may be selectively extended or retracted from the dashboard. In operation, the heads up display 33 may be substantially transparent depending on an operating configuration controlled by the controller. Accordingly, the controller may be configured to selectively adjust a transmittance or transparency of the electro-optic device 42 to adjust a contrast of the image data and/or graphics displayed on the heads up display 33.

Referring now to FIGS. 2A and 2B, a front view and a side, cross-sectional view of the display assembly 32 are shown, respectively. In some embodiments, the disclosure may provide for various embodiments of the display system 10 operable to selectively function as a digital image display in the display state 14 and a mirror device 24 in the transparent state 16. The waveguide display 12 may be substantially transparent and comprise one or more waveguides 34 configured to direct image data through the viewing surface 18. The waveguide display 12 may further comprise at least one display driver 36 configured to project image data into the at least one waveguide 34. The display driver 36 may comprise a microdisplay, laser module, beam expansion, collimator, and relay optics configured to project the image data. Exemplary embodiments of waveguide displays are discussed in reference to FIGS. 3A, 3B, and 3C.

A mirror element 38 may be disposed behind the waveguide display 12 relative to a viewing direction 40 of the viewer 20. The mirror element 38 may comprise an electro-optic device 42 configured to vary a reflectivity in response to an applied voltage. The mirror element 38 may include a first (or front) element 50 and a second (or rear) element 52. The first element 50 and the second element 52 may be sealably bonded in a spaced-apart relationship to define a chamber 54. Front element 50 has a front surface 50a and a rear surface 50b. The rear element 52 has a front surface 52a and a rear surface 52b. For purposes of further reference, the front surface 50a of the front element 50 may be referred to as the first surface, and the rear surface 50b of the front element 50 may be referred to as a second surface 50b. The front surface 52a of the rear element 52 may be referred to as a third surface, and the rear surface 52b of rear element 52 may be referred to as a fourth surface. In an exemplary embodiment, both elements 50 and 52 may correspond to substantially transparent substrates sealably bonded via a seal member 56. In some embodiments, an innermost portion of the waveguide 34 directed away from the viewer 20 may be utilized as the first element 50.

The mirror element 38 may include a first electrode 58 carried on one of the second surface 50b and the third surface 52a. A second electrode 60 may be disposed on one of the second surface 50b and third surface 52a. The first electrode 58 may comprise one or more layers and may function as a color suppression coating. The second electrode 60 may be reflective, transflective, or comprise a reflector layer 62 on the fourth surface 52b. In such embodiments, the second electrode 60 may be substantially transparent. In an exemplary embodiment, the second electrode 60 is reflective or transflective and configured to reflect a scene rearward of the vehicle 28.

The chamber 54 formed by the first element 50 and the second element 52 may be configured to retain an electro-optic medium 64 configured to vary in transmittance in response to the voltage received from a controller via the first electrode 58 and the second electrode 60. The electro-optic medium 64 may correspond to an electro-chromic medium. Examples of electro-optic mirror constructions are disclosed in U.S. Pat. No. 5,434,407, entitled "AUTOMATIC REARVIEW MIRROR INCORPORATING LIGHT PIPE," issued Jan. 18, 1995, to F. T. Bauer et al.; U.S. Pat. No. 5,448,397, entitled "OUTSIDE AUTOMATIC REARVIEW MIRROR FOR AUTOMOTIVE VEHICLES," issued Sep. 5, 1995, to W. L. Tonar; U.S. Pat. No. 5,451,822, entitled "ELECTRONIC CONTROL SYSTEM," issued Sep. 19, 1995, to J. H. Bechtel et al.; U.S. Pat. No. 5,818,625, entitled "ELECTROCHROMIC REARVIEW MIRROR INCORPORATING A THIRD SURFACE METAL REFLECTOR," issued Oct. 6, 1998, to Jeffrey A. Forgette et al.; and U.S. Pat. No. 6,157,480, entitled "SEAL FOR ELECTROCHROMIC DEVICES," issued Dec. 5, 2000, to John S. Anderson et al. Each of these patents is commonly assigned with the present invention and the disclosures of each, including the references contained therein, are hereby incorporated herein in their entirety by reference.

In an exemplary embodiment, the electro-optic device 42 may be color neutral. For example, the electro-optic device 42 may correspond to a color neutral electro-chromic element. The color neutral element may darken in a gray-scale, which may prevent a discoloration of the image data displayed on the viewing surface 18. An example of a color neutral electro-chromic element is described in U.S. Pat. No. 6,020,987, entitled "ELECTROCHROMIC MEDIUM CAPABLE OF PRODUCING A PRE-SELECTED COLOR," the entire disclosure of which is incorporated herein by reference.

Referring still to FIGS. 2A and 2B, the waveguide display 12 may comprise one or more waveguides (e.g. the at least one waveguide 34). In particular reference to FIG. 2B, the waveguide 34 may comprise a diffractive element 66 or output grating configured to convey image data from waveguide 34 outward to the viewer 20. The diffractive element 66 may comprise a total internal reflective (TIR) body configured to reflect the light within the waveguide 34 before it is extracted or diffracted out through the diffractive element 66 or output grating. The diffractive element 66 may be configured to diffract the internal reflected light from the display driver 36 along a length of the waveguide 34 to control the emission of light to the viewer 20. The light emitted to the viewer 20 may be referred to herein as generated light.

The generated light may be diffracted due to interactions between a structure of the diffractive element 66 and the light waves propagated through the waveguide 34. The diffraction of the light may occur due to the diffractive element 66 interfering with the passage of wavelengths of visible light ranging from approximately 400 to 700 nanometers (nm) in wavelength. Accordingly, the structure of the diffractive element 66 may be formed to reflect the wavelengths of light in the visible scale outward from the waveguide to the viewer 20. For example, the structure of the diffractive element 66 may be formed on a nanoscale to provide for controlled extraction of the visible light from the waveguide 34 over the surface of the display system 10.

The diffractive element 66 may comprise a periodic structure formed on a surface of the diffractive element 66. The periodic structure may comprise a plurality of grooves that may be distributed over the surface. The grooves may vary in shape and size to accurately reflect or interfere with the passage of the light through the waveguide 34. The geometry and proportions of the grooves may vary based on a fabrication process or desired performance characteristics of the waveguide 34. In some embodiments, the diffractive element 66 may be manufactured via one or more etching or deposition processes configured to form the diffractive element 66 on one or more surfaces of the waveguide. In this way, the waveguide 34 may be manufactured on a micro or nanoscale to project the visible light in the form of image data or rendered graphics from the waveguide 34 outward to the viewer 20.

Figure 3C:
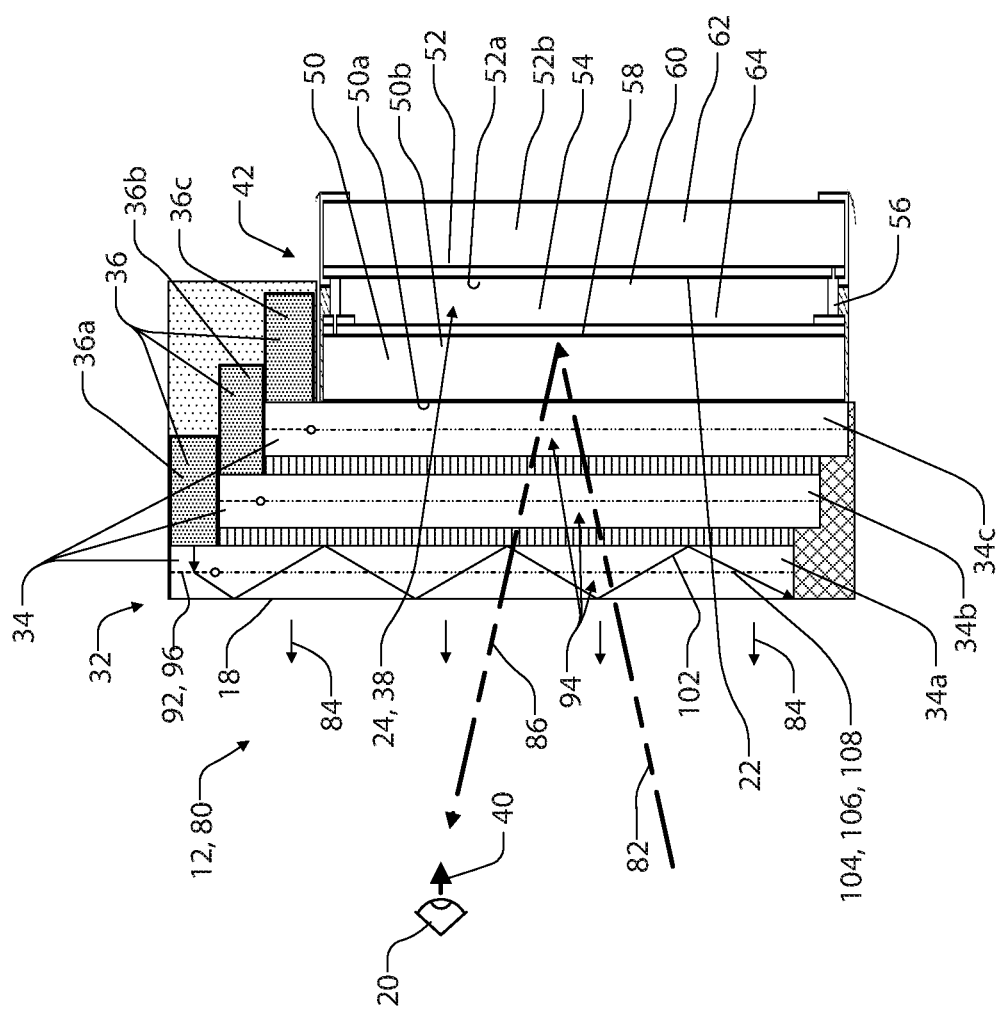
FIG. 3C is a detailed cross-sectional view of a display assembly in a hybrid mirror display state, in accordance with another aspect of the disclosure.

Referring now to FIGS. 3A, 3B, and 3C, the side, cross-sectional views of the display assembly 32 are demonstrated in the display state 14, the transparent state 16 or mirror state 76, and a combined mirror-display state 80. As discussed previously, the waveguide display 12 may comprise a plurality of waveguides 34. The plurality of waveguides 34 may correspond to a first waveguide 34a, a second waveguide 34b, and a third waveguide 34c. The first waveguide 34a may be configured to receive a first image data from a first display driver 36a, the second waveguide 34b may be configured to receive a second image data from a second display driver 36b, and the third waveguide 34c may be configured to receive a third image data from a third display driver 36c. In this configuration, each of the display drivers may be configured to project a different color of light. For example, the first display driver 36a may be configured to project the first image data corresponding to red light, the second display driver 36b may be configured to project the second image data corresponding to green light, and the third display driver 36c may be configured to project the third image data corresponding to blue light.

Further details describing how light can be projected into a waveguide are disclosed in U.S. Pat. No. 5,856,842, entitled, "APPARATUS FACILITATING EYE-CONTACT VIDEO COMMUNICATIONS" assigned to Kaiser Optical Systems, Inc., which is incorporated herein by reference in its entirety. The display drivers 36 may comprise a diffractive element 66 at the input to each waveguide 34. The light projected into each of the waveguides 34 may be collimated by a collimator in order to maintain image content as it propagates across the viewing surface 18. By utilizing this process, the image data display on the viewing surface 18 may appear to be focused at infinity. The projection of the image data having an appearance of being focused at infinity may limit a perceived eye strain of the viewer 20 due to accommodation between a distance of the display assembly 32 and the far-off objects typically viewed while operating the vehicle 28.

Referring now to FIGS. 3A, 3B, and 3C, the controller may be operable to selectively activate the display assembly 32 in a plurality of states. In a first state (e.g. the display state 14), the display assembly 32 may be configured to function as a display screen configured to display image data. The display state 14 is demonstrated in FIG. 3A and may comprise the controller activating one or more of the display drivers 36 to display image data, while controlling the transmittance of the electro-optic device 42 to limit or block the transmission of a received light 82 from impinging upon the mirror element 38.

For example, in the display state 14, the controller may control the transmittance of the electro-optic device 42 to darken the electro-optic device 42. In this way, a high level of contrast may be achieved to provide a dark background over which the waveguides 34 may display the image data as generated light 84. In an exemplary embodiment, the electro-optic device 42 may darken or increase in opacity such that the mirror element 38 may be less than 4 percent reflective. In some embodiments, the electro-optic device 42 may limit the effective reflectance of the mirror element to less than 2 percent. The contrast of the electro-optic device 42 may ensure that the generated light 84 is clearly visible without displaying the received light 82 from the mirror element 38. As discussed herein, the display state 14 may provide for the display of image data that may be received by one or more imagers in communication with the display system 10 to assist with operation of the vehicle 28.

In a second state (e.g. the transparent state 16 or mirror state 76), the controller may control the transmittance of the electro-optic device 42 to allow the received light 82 to pass through the electro-optic medium 64. In this configuration, the controller may further deactivate, the display drivers 36 such that the waveguides 34 are substantially transparent. Accordingly, the received light 82 may be transmitted through the waveguides 34 and reach the mirror element 38 significantly unabated. The received light 82 may be reflected from the mirror element 38 as reflected light 86. In this configuration, the reflected light 86 may be visible to an operator or passenger of the vehicle such that the scene rearward of a vehicle 28 may be visible similar to a conventional rearview mirror.

In a third state, the display system 10 may be configured to function in the combined mirror-display state 80. In such a state, the controller may be operable to control the transmittance of the electro-optic device 42 to allow the received light 82 to pass through the electro-optic medium 64, similar to the transparent state 16. In this configuration, the received light 82 may be transmitted through the waveguides 34, and the reflected light 86 may be visible to an operator of the vehicle 28. Additionally, the controller may be configured to activate one or more of the waveguides 34 of the waveguide display 12 to superimpose graphics or image data as the generated light 84 over the reflected light 86 demonstrating the rearward directed scene. The graphics and/or image data may correspond to various information configured to assist in operation of the vehicle 28 as further discussed in reference to FIG. 5.

In various embodiments, the operation of the waveguides 34, as discussed herein, may utilize a switchable input grating 92 to control the transmission of polarized light into an internal reflective structure 94 of each of the waveguides 34 via a light injection area 96. In operation, the controller may control the switchable input grating 92 between a first state (e.g. an active state) and a second state (e.g. a passive state). In the first state, the switchable input grating 92 may transmit polarized light received from the display driver 36 at the light injection area 96 into the internal reflective structure 94 of the waveguide 34. An example of the transmitted light is demonstrated in FIG. 3A and FIG. 3C as internal reflected light 102 transmitted within the internal reflective structure 94.

The internal reflected light 102 may correspond to light diffracted from the switchable input grating 92 into the waveguide 34. The internal reflected light 102 may undergo a total internal reflection within the waveguide 34 before it is extracted or diffracted out of the waveguide 34. The internal reflected light 102 may be extracted by an output grating 104. The output grating 104 may be configured to diffract the internal reflected light 102 from the waveguide 34 along a length to control the emission of the generated light 84. Though some elements (e.g. the switchable input grating 92, the output grating 104, etc.) are only labeled in reference to the first waveguide 34a, each of the waveguides 34 may be configured similarly.

The switchable input grating 92 may correspond to a device that utilizes Bragg diffraction to control the transmission of the internal reflected light 102 into the waveguide 34. In some embodiments, the switchable input grating 92 may correspond to a Switchable Bragg Grating (SBG). As discussed herein, the SBG may correspond to periodic structure that may be controlled by the controller by applying an electrical field. The periodic structure may correspond to liquid crystal nanodroplets that are spatially distributed in a polymer matrix to form an electro-optic medium. Such a medium may be referred to as a holographic polymer dispersed liquid crystal (H-PDLC). Accordingly, the controller may selectively control the switchable input grating 92 to diffract the reflected light 86 into the waveguide 34. In this way, the controller may be configured to control the passage of polarized light into each of the waveguides 34a, 34b, and/or 34c by controlling the state of the corresponding switchable input gratings 92.

In some embodiments, the output grating 104 may correspond to a passive output grating. In such embodiments, the output grating 104 may be configured to have only a single state of operation. For example, the output grating 104 may correspond to a Passive Bragg Grating (PSG) that is permanently configured to operate similar to the active state of the switchable input grating 92. For example, in some embodiments, the output grating 104 may be permanently configured to diffract the internal reflected light 102 out along the length of the waveguide 34. The internal reflected light 102 may be diffracted from the waveguide 34 via lossy transmission such that a portion of the internal reflected light 102 is emitted outward from the waveguide 34 from each reflection of the internal reflected light 102 that intersects with the output grating 104. In this configuration, the generated light 84 may be emitted from the output grating 104 along the length of the waveguide 34 forming the light extraction area 106.

In some embodiments, the output grating 104 may correspond to a switchable output grating 108. The switchable output grating 108 may provide for improved operation of the display system 10 in some applications. For example, in the display state 14, the controller may be configured to control the transmittance of the electro-optic device 42 to darken the electro-optic device 42. In this way, a high level of contrast may be achieved to provide a dark background over which the waveguides 34 may display the image data as generated light 84. Accordingly, in the display state 14, the controller may be configured to control the switchable output grating 108 to operate in a first state (e.g. active state). In the first state, the controller may apply an electrical field to the switchable output grating 108 such that the internal reflected light 102 is diffracted from the waveguide 34 by the switchable output grating 108 over the light extraction area 106.

In the transparent state 16 or mirror state 76, the controller may control the transmittance of the electro-optic device 42 to allow the received light 82 to pass through the electro-optic medium 64. In this configuration, the controller may further deactivate the display drivers 36 such that the waveguides 34 are substantially transparent. Accordingly, the received light 82 may be transmitted through the waveguides 34 and reach the mirror element 38 significantly unabated. The received light 82 may be reflected from the mirror element 38 as reflected light 86. Additionally, in the transparent state 16 or mirror state 76, the controller may control the switchable output grating 108 to the second state (e.g. the inactive state). In this configuration, the received light 82 may pass through the switchable output grating 108 without diffracting the received light 82.

The selective diffraction state of the switchable output grating 108 may provide for a reduction in a diffraction pattern of the received light 82 in the light extraction area 106. For example, in the mirror state 76, if the received light passes through the output grating 104 in the form of a passive output grating or the switchable output grating 108 in an active state, the reflected light 86 from the mirror element 38 may demonstrate a distortion in the form of the diffraction pattern of the output grating 104. However, if the switchable output grating 108 is controlled to the second state (e.g. inactive state) in the transparent state 16 or the mirror state 76, the reflected light 86 may be emitted from the mirror element 38 without the distortion corresponding to the diffraction pattern of the output grating 104 that may occur in the first state (e.g. active state). Accordingly, utilizing the switchable output grating 108 may provide for improved performance of the display system 10 in the mirror state 76.

The diffraction pattern of the reflected light 86 from the switchable output grating 108 in the first state (e.g. active state) and/or due to the passive output grating 104, may be particularly noticeable when viewing the reflections of point light sources on the display system 10. For example, the distortion of the diffraction pattern may be particularly noticeable when viewing the reflected light 86 corresponding to a vehicle headlight. Accordingly, the embodiments of display system 10 may provide for the controller to selectively control the state of the switchable output grating 108 to the second state (e.g. inactive) when operating in the transparent state 16 or mirror state 76. In this way, the distortion may not result when the reflected light 86 passes through the switchable output grating 108 to provide an improved quality of the reflected light 86.

Referring now to FIGS. 2A, 4A, 4B, and 4C, various configurations of the display system 10 are shown demonstrating a configuration of a display driver for the waveguide display 12. In FIG. 2A, the display drivers 36 are shown extending along an upper portion 114 of the display assembly 32. In FIG. 4A, the display drivers 36 are shown extending along an upper portion 114 and a lower portion 116 of the display assembly 32. The upper portion 114 and lower portion 116 may correspond to horizontal perimeter portions of the display assembly 32 relative to the orientation of the display assembly 32 illustrated in FIG. 1. As shown in FIG. 4A, at least one of the display drivers 36 and/or various corresponding drive circuits or hardware may be distributed along the upper portion 114 and the lower portion 116 to provide a distributed edge mounted display.

In FIG. 4B, the display drivers 36 are shown extending along a first side portion 118 and a second side portion 120 of the display assembly 32. In FIG. 4C, the display drivers 36 are shown extending along the second side portion 120 of the display assembly 32. The first side 118 and the second side 120 may correspond to vertical perimeter portions of the display assembly 32 relative to the orientation of the display assembly 32 illustrated in FIG. 1. As shown in FIG. 4C, at least one of the display drivers 36 and/or various corresponding drive circuits or hardware may be distributed along the first side portion 118 and the second side portion 120 to provide a distributed edge mounted display.

Figure 5:
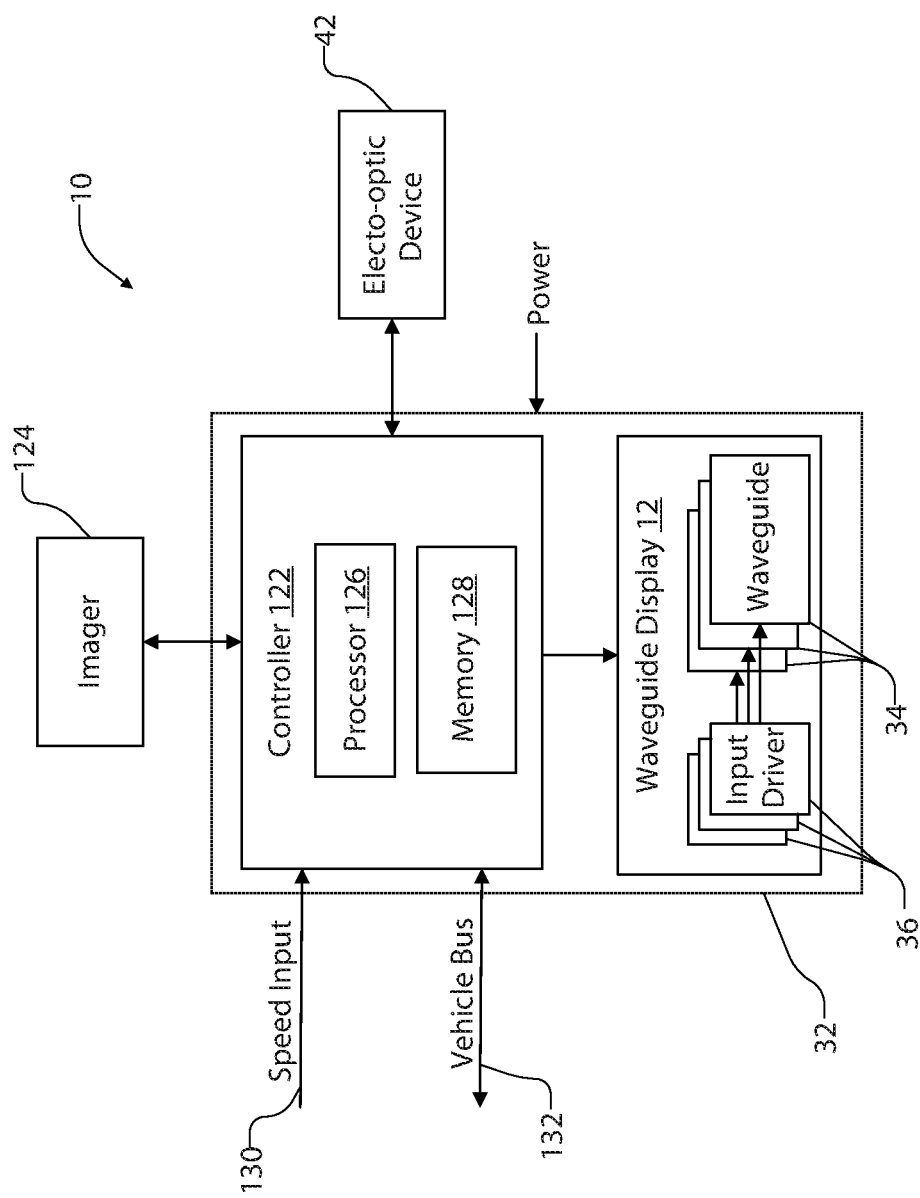
FIG. 5 is a block diagram of a display system in accordance with the disclosure.

Referring now to FIG. 5, a block diagram of the display system 10 is shown. As discussed herein, a controller 122 of the display system 10 may be in communication with at least one imager 124. In some embodiments, the imager 124 may correspond to a complementary metal-oxide-semiconductor (CMOS), for example a CMOS active-pixel sensor (APS) or a charge coupled device (CCD). In this configuration, the controller 122 may be operable to process the image data as supplied in analog or digital form from the imager 124.

The controller 122 may further be operable to output the image data captured by the imager 124 on the waveguide display 12. The waveguide display 12 may comprise the plurality of waveguides 34 configured to direct image data over the display window. The waveguide display 12 may further comprise a plurality of display drivers 36 configured to project image data and/or graphics into each waveguide 34 of the plurality of waveguides 34. Each of the display drivers 36 may comprise a microdisplay, laser module, beam expansion, collimator, and relay optics configured to project the image data. Additional information regarding a waveguide displays is discussed in U.S. Pat. No. 9,933,684, entitled, "TRANSPARENT WAVEGUIDE DISPLAY PROVIDING UPPER AND LOWER FIELDS OF VIEW HAVING A SPECIFIC LIGHT OUTPUT APERTURE CONFIGURATION," which is incorporated by reference in its entirety.

The controller 122 may further be operable to control the electro-optic device 42 to control the reflectance of the received light 82. The electro-optic device 42 may comprise an electro-optic medium 64 configured to vary in transmittance in response to the voltage received from the controller 122 via the first electrode 58 and the second electrode 60. The electro-optic medium 64 may correspond to an electrochromic medium. The controller 122 may comprise a processor 126 operable to process the image data as supplied in analog or digital format from the imager 124. In various embodiments, the processor 126 may be implemented as a plurality of processors, a multicore processor, or any combination of processors, circuits, and peripheral processing devices.

The controller 122 may further comprise a memory 128. The memory 128 may comprise various forms of memory, for example, random access memory (RAM), dynamic RAM (DRAM), synchronous DRAM (SDRAM), and other forms of memory configured to store digital information. The memory 128 may be configured to store the image data from the imager 124 for processing. Processing the image data may comprise scaling and cropping as well as rendering graphical data for display on the waveguide display 12. In some embodiments, the memory 128 may further be configured to store additional programming information including method and processes for operation of the display system 10.

The controller 122 may further be in communication with a plurality of inputs, for example, a speed input 130, and a vehicle bus 132. The speed input 130 may provide a signal communicating a speed of the vehicle 28 via a speedometer or any device operable to measure and communicate data corresponding to the speed of a vehicle 28. The vehicle bus 132 may be implemented using any suitable standard communication bus, such as a Controller Area Network (CAN) bus, a Local Interconnect Network (LIN) bus, etc. The vehicle bus 132 may be configured to provide a variety of additional information to the controller 122. Such information may correspond to one or more vehicle states, for example a gear selection, passenger occupancy, a headlight activation, etc., which may be utilized by the controller 122 to control the display of the image data and/or the transmission state of the electro-optic device 42.

It will be appreciated that embodiments of the disclosure described herein may be comprised of one or more conventional processors and unique stored program instructions that control one or more processors to implement, in conjunction with certain non-processor circuits, some, most, or all of the functions of an image sensor system and method thereof, as described herein. The non-processor circuits may include, but are not limited to, signal drivers, clock circuits, power source circuits, and/or user input devices. Alternatively, some or all functions could be implemented by a state machine that has no stored program instructions, or in one or more application specific integrated circuits (ASICs), in which each function or some combinations of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be appreciated by those skilled in the art that the above described components may be combined in additional or alternative ways not explicitly described herein. Modifications of the various implementations of the disclosure will occur to those skilled in the art and to those who apply the teachings of the disclosure. Therefore, it is understood that the embodiments shown in the drawings and described above are merely for illustrative purposes and not intended to limit the scope of the disclosure, which is defined by the following claims as interpreted according to the principles of patent law, including the Doctrine of Equivalents.

What is claimed is:

1. A vehicle display mirror system, comprising:
   an electro-optic device configured to switch between a mirror state and a display state comprising:
      a first substantially transparent substrate having first and second surfaces disposed on opposite sides thereof, wherein at least one of the first and second surfaces comprises a first electrically conductive layer;
      a second substantially transparent substrate having third and fourth surfaces disposed on opposite sides thereof, wherein at least one of the third and fourth surfaces comprises a second electrically conductive layer;
      an electro-optic medium is disposed in a cavity between the first and second substantially transparent substrates, the electro-optic medium is variably transmissive such that the electro-optic device is operable between a substantially clear state and a darkened state;
   a substantially transparent display disposed adjacent to the electro-optic device, the substantially transparent display comprising:
      a plurality of display drivers configured to generate light, wherein the display drivers are mounted along a first portion and a second portion of a perimeter edge of the substantially transparent display;
      a switchable input grating configured to selectively diffract the light into a waveguide; and
      a switchable output grating configured to selectively diffract the light outward from the waveguide; and
   wherein the electro-optic device is converted to the darkened state when the substantially transparent display is emitting the light.

2. The emissive display system of claim 1, wherein the switchable output grating is controlled to an active state when the display is emitting the light thereby diffracting the light outward from the waveguide.

3. The emissive display system of claim 1, wherein the switchable output grating is controlled to an inactive state when the display is inactive.

4. The emissive display system of claim 3, wherein the inactive state of the switchable output grating is configured to prevent a distortion of reflected light impinging upon the electro-optic device in the mirror state.

5. The emissive display system of claim 1, wherein the substantially transparent display corresponds to a waveguide display.

6. The emissive display system of claim 5, wherein the waveguide display is configured to display image data on a display surface of the substantially transparent display.

7. The emissive display system of claim 1, wherein the electro-optic medium is an electrochromic medium.

8. A method for displaying a rearward directed view from a vehicle for a display mirror system, the method comprising:
   in a first display state, reflecting a rearward directed view in a projection direction through a transparent waveguide display from a mirror surface;
   adjusting from the first display state to a second display state by controlling a transmittance of an electro-optic element; and
   activating a plurality of display drivers disposed along a first edge portion and a second edge portion positioned on opposite sides of the transparent waveguide display and transmitting visual light data into the transparent waveguide display in the second display state, wherein the second display state is configured to project the visual light data from the transparent waveguide display in the projection direction such that the electro-optic element controls the contrast of the visual light data projected from the transparent waveguide display.

9. The method according to claim 8, further comprising:
   adjusting the display mirror system to a third display state by controlling the electro-optic element to a light transmissive state.

10. The method according to claim 9, further comprising:
    in the third state, superimposing the visual light data from the transparent waveguide display over the reflected rearward directed view.

11. The method according to claim 9, wherein the controlling the transmittance of the electro-optic element to the second display state comprises controlling the electro-optic element to a first transmission state.

12. The method according to claim 11, wherein the controlling a transmittance of the electro-optic element to the third display state comprises controlling the electro-optic element to a second transmission state.

13. The method according to claim 12, wherein the second transmission state comprises a higher level of light transmission of the reflected rearward directed view than the first transmission state.

14. The method according to claim 13, wherein the first transmission state increases a contrast of the visual light data displayed on the transparent waveguide display.

15. The method according to claim 8, wherein the visual light data is projected from the transparent waveguide display by diffracting the wavelengths of the visual light data through a diffractive element.

16. A vehicle display mirror system, comprising:
an electro-optic device configured to switch between a mirror state and a display state comprising:
a first substantially transparent substrate having first and second surfaces disposed on opposite sides thereof, wherein at least one of the first and second surfaces comprises a first electrically conductive layer;
a second substantially transparent substrate having third and fourth surfaces disposed on opposite sides thereof, wherein at least one of the third and fourth surfaces comprises a second electrically conductive layer;
an electro-optic medium is disposed in a cavity between the first and second substantially transparent substrates, the electro-optic medium is variably transmissive such that the electro-optic device is operable between a substantially clear state and a darkened state;
a substantially transparent display disposed adjacent to the electro-optic device, the substantially transparent display comprising:
a plurality of display drivers configured to generate light, wherein the display drivers are mounted along a first portion and a second portion of a perimeter edge of the substantially transparent display;
a waveguide comprising a diffractive element, wherein the diffractive element is configured to selectively extract the light from the waveguide outputting visual light data on the transparent display, wherein the electro-optic device is converted to the absorptive state in the display state.

17. The emissive display system of claim 16, wherein the waveguide display is configured to display image data on a display surface of the substantially transparent display in the display state.

18. The emissive display system of claim 16, wherein the electro-optic device is converted to the transmissive state in response to the mirror state.

19. The emissive display system of claim 17, wherein the electro-optic medium is an electrochromic medium.

20. The emissive display system of claim 1, wherein first portion is positioned and on an opposite side of the perimeter edge of the substantially transparent display relative to the second portion.

* * * * *